(12) United States Patent
Hahniche et al.

(10) Patent No.: US 9,250,615 B2
(45) Date of Patent: Feb. 2, 2016

(54) METHOD FOR PARAMETERING A FIELD DEVICE OF PROCESS AUTOMATION TECHNOLOGY

(71) Applicant: Endress + Hauser Process Solutions AG, Reinach (CH)

(72) Inventors: Jorg Hahniche, Bad Krozingen (DE); Immanuel Vetter, Sinzheim (DE); Julien Messer, Grentzingen (FR); Frank Birgel, Schopfheim (DE); Tobias Horn, Altdorf (DE)

(73) Assignee: Endress + Hauser Process Solutions AG, Reinach (CH)

( * ) Notice: Subject to any disclaimer, the term of this patent is extended or adjusted under 35 U.S.C. 154(b) by 479 days.

(21) Appl. No.: 13/717,965

(22) Filed: Dec. 18, 2012

(65) Prior Publication Data

US 2013/0173025 A1 Jul. 4, 2013

(30) Foreign Application Priority Data

Dec. 22, 2011 (DE) .......................... 10 2011 089 622

(51) Int. Cl.
*G05B 11/01* (2006.01)
*G05B 19/042* (2006.01)

(52) U.S. Cl.
CPC .............. *G05B 11/01* (2013.01); *G05B 19/042* (2013.01); *G05B 2219/25092* (2013.01)

(58) Field of Classification Search
USPC ........ 700/42, 35, 45, 96, 79; 715/735; 710/19
See application file for complete search history.

(56) References Cited

U.S. PATENT DOCUMENTS

| 6,032,203 | A  | * | 2/2000  | Heidhues ................ H04L 69/08 709/230 |
| 7,453,834 | B2 | * | 11/2008 | Tapperson ......... G05B 19/4185 340/3.1 |
| 7,643,639 | B2 | * | 1/2010  | Kaszkin et al. ............... 380/277 |
| 8,219,790 | B2 | * | 7/2012  | Chomik ............. G05B 19/0423 700/17 |
| 8,315,721 | B2 | * | 11/2012 | Horn ............................... 700/86 |
| 2004/0098408 | A1 | * | 5/2004 | Gensel ........................ 707/104.1 |
| 2006/0233119 | A1 | * | 10/2006 | Cline ............................. 370/257 |
| 2008/0313629 | A1 |   | 12/2008 | Vetter |
| 2009/0309692 | A1 | * | 12/2009 | Chomik et al. ................ 340/3.5 |

FOREIGN PATENT DOCUMENTS

| DE | 102007058609 A1 | 7/2008 |
| DE | 102007063312 A1 | 7/2009 |
| DE | 102008010484    | 8/2009 |

(Continued)

OTHER PUBLICATIONS

German Search Report, Sep. 17, 2012, Munich.

*Primary Examiner* — Kidest Bahta
(74) *Attorney, Agent, or Firm* — Bacon & Thomas, PLLC

(57) ABSTRACT

A method for parametering a field device of process automation technology, wherein the field device has a certain number of device parameters, and wherein the method comprises the steps of providing a plurality of parametering modules, wherein at least one of the parametering modules specifies values for parameters of a first portion of the device parameters for parametering the field device; registering with an auxiliary module data, which relate to the application, in which the field device is to be applied; and selecting by means of the auxiliary module one of the parametering modules for parametering of the field device.

8 Claims, 1 Drawing Sheet

(56) References Cited

FOREIGN PATENT DOCUMENTS

| | | |
|---|---|---|
| DE | 102008001886 | 11/2009 |
| DE | 102008043095 | 4/2010 |
| WO | WO 2009/083422 A1 | 7/2009 |
| WO | WO 2009/141279 A1 | 11/2009 |

* cited by examiner

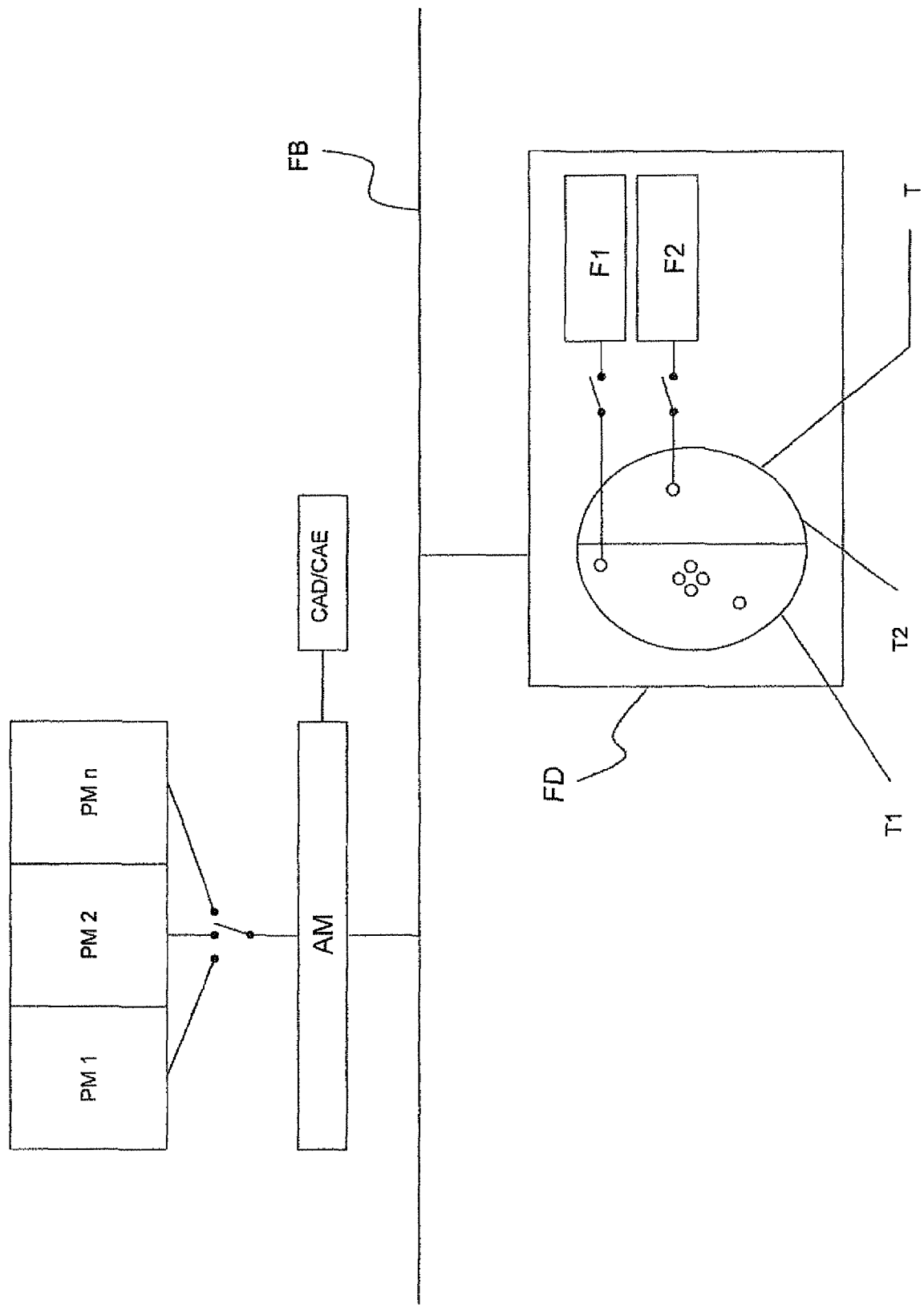

METHOD FOR PARAMETERING A FIELD DEVICE OF PROCESS AUTOMATION TECHNOLOGY

TECHNICAL FIELD

The invention relates to a method for parametering a field device of process automation technology.

BACKGROUND DISCUSSION

Known from the state of the art, for example, from Offenlegungsschrift DE 102007063312 A1, is a parametering system and a method for parametering a field device. In such case, an assistance module and a parametering module are used, in order to translate data for an application of the customer into suitable parameter values for the field device and to store the parameter values or to transmit such to the field device. In such case, the parametering module serves to determine a set of parameters, or parameter values, which establish the operation of the field device. In such case, it is thus necessary to produce from the application data always a fitting set of parameters, a procedure that is, however, in given cases, time- and energy intensive, when each parameter must be individually determined.

SUMMARY OF THE INVENTION

An object of the invention is to provide a method, which makes it easier to parameter a field device based on data for a predetermined application, especially to shorten time required for parametering and/or to create a simpler backup of the parameter settings of the field device.

The object is achieved by a method for parametering a field device of process automation technology, wherein the field device has a certain number of device parameters, and wherein the method comprises steps as follows: providing a plurality of parametering modules, wherein at least one of the parametering modules specifies values for parameters of a first portion of the device parameters for parametering the field device, registering with an auxiliary module data which relate to the application, in which the field device is to be applied, and selecting by means of the auxiliary module one of the parametering modules for parametering the field device.

Thus, a parametering module is used to establish, or specify, the parameters, or parameter values, of a first portion of device parameters. These parameters, or parameter values, can be stored, for example, statically in the parametering module. For example, a number of these parametering modules can be provided, in which the parameters, or parameter values, are specified for certain applications of the field device. Preferably, in such case, for a certain application, also at least one determined parametering module is provided. Depending on the application ascertained by the auxiliary module, then at least one of these parametering modules is selected for parametering the field device and, for example, transmitted to the field device. The selected parametering module then determines the behavior of the field device for its run time, while the field device is performing its application.

Usually, before start-up, the parameters, or parameter values, of a device are set to standard values, i.e. so-called default values. Through the selection of a parametering module, then the part of the parameters of the field device whose parametering is specified by the parametering module, is set to the values stored in the parametering module, furnished there or specified by the parametering module.

In a form of embodiment of the method, one of the parametering modules is selected by the auxiliary module by performing a comparison of data, which relate to the application of the field device, with furnished data, and wherein, based on the comparison, especially based on agreements of the data with the furnished data, one of the parametering modules is selected.

In an additional form of embodiment of the method, the field device has different functions, which are furnished in the field device and can be activated, wherein the parameters of the field device are associated with at least one of the functions of the field device, and wherein the activating of one of the functions is done by the parametering module and/or established in the parametering module.

Thus, a parametering module can be selected, for example, based on the active field device functions, in order to supply the parameters, or parameter values, required for these device functions.

Field devices currently make use of a number of device functions, which, indeed, are often performable in each field device or by each field device, but, however, are not required for each application. The auxiliary module can be used, for example, to query which functions of the field device are activated, or, as a function of the application, must be activated for performance of such application by the field device. Then, as a function of the activated device function, the required parametering module for parametering the field device can be selected and/or transmitted to the field device. The field device then incorporates the parameters, or parameter values, furnished in the parametering module, and, in given cases, corresponding field device functions are activated.

In an additional form of embodiment of the method, by means of one of the parametering modules, a second portion of parameters is selected, whose parameter values are established before start-up of the field device, for example, by a service person. The parametering module specifies, for example, only a first portion the parameter of the field device, so-to-say statically, while then, as a function of the selected parametering module, yet other application-specific parameter settings can be made, for example, by a user, i.e. a service person. Thus, the parametering of the field device can be facilitated by the parametering module in such a manner that input from a user is only required where the user must still set corresponding parameters, or parameter values. Furthermore, the selection of a parametering module can limit certain field device settings, so that parameter settings in the field device can, after the selection of a parametering module, only be carried out to a limited extent. These still to be performed settings can involve, for example, a second portion of the parameters of the field device.

In an additional form of embodiment of the method, the first and the second portions are complementary or overlapping and the joining of the first and the second portions preferably forms the entire amount of parameters of the field device. Preferably, the parameters of the first portion are specified by the selected parametering module and, for example, the user then supplements only with the parameters, or parameter values, of the second portion, so that then a complete parametering of the field device is achieved.

In an additional form of embodiment of the method, the parametering modules are matched to different applications of the field device. Preferably, thus, the parametering modules are matched, by the parameters, or parameter values, contained in them, to specific applications. The present application is ascertained, in such case, by the auxiliary module based on data, which relate to the application of the field device, In an additional form of embodiment of the method, a backup of the parameters of the field device is done by backing up only the parameters associated with the active functions of the field device, which are preferably downloaded from the field device, especially via a fieldbus.

As already mentioned, currently only certain, i.e. selected, functions of a field device can be activated, e.g. only when, this/ese function/s is/are required for the application of the field device. Depending on the functions and the therewith connected parameters, or parameter values, then only those parameters, or parameter values, are backed up (for example, by storing them outside of the field device), which are associated with an active function of the field device, i.e. belong to such functions and determine their operation. Thus, effort for backing up parameters, or parameter values, of a field device can be significantly reduced, since the parameters belonging to not active functions do not, for example, need to be queried and/or transmitted via a fieldbus or other data line.

In an additional form of embodiment of the method, backup of the parameters of the field device is done, furthermore, by backing up the values of the parameters specified by the selected parametering module. Furthermore, it is, thus, in given cases, not even required to retrieve the actually present parameters, or parameter values, from the field device. Rather, a backup can now occur already based on the selected parametering module and/or the active field device function/s, since the parameters, or parameter values, set in the field device are those specified by the parametering module.

In an additional form of embodiment of the method, the data, which relate to the application of the field device, are CAD/CAF data. In the case of the design of a plant, currently often CAD- or CAE-systems are applied, whose data can, for example, be accessed, in order to select a parametering module by means of the auxiliary module.

BRIEF DESCRIPTION OF THE DRAWINGS

The invention will now be explained in greater detail based on the appended drawing, the sole FIGURE of which shows as follows:

FIG. 1 is a schematic representation of an apparatus for performing the proposed method.

DETAILED DISCUSSION IN CONJUNCTION WITH THE DRAWING

FIG. 1 shows a field device FD making use of a number of parameters T, which determine the operation of the field device FD. Furthermore, the field device FD has a number of device functions F1, F2, which are activatable, or deactivatable—this being indicated by the schematic representation of switches in FIG. 1 between the device functions F1, F2 and individual parameters, or parameter values. These device functions F1, F2 can, in such case, be activated, or deactivated, by the settings of certain parameters, or parameter values. The individual parameters, or their parameter values, are indicated in FIG. 1 by circles within the totality of the parameters T of the field device FD.

The field device FD according to the example of an embodiment in FIG. 1 is connected via a fieldbus FB with a servicing device. Instead of the fieldbus FB, however, also another data connections can be utilized, in order to communicate, or to exchange data, with the field device FD. The servicing device, not shown, makes use of an auxiliary module AM and a plurality of parametering modules PM1, PM2, PMn and is connected, or connectable, with a data memory or an interface, in which CAD/CAE data are present, or via which CAD/CAE data are obtainable, which relate to the application of the field device FD.

For example, it can be ascertained, based on CAD data, that a fill level device (e.g. Levelflex FMP5x) is to be applied in an application as "limit switch installed horizontally". In a graphical user interface, for example, such used for on-site servicing of the fill level device, after selection of a corresponding parametering module PM1, PM2, PMn by the auxiliary module AM, the suitable user interface for the application is activated. On this user interface, a user can then make still required settings, which concern a second portion T2 of the parameters of the field device FD. The first portion T1 of parameters T, which serve for performance of the function/s F1 of the field device FD in the aforementioned application, are, at this point in time, already specified by the selected parametering module and have been transmitted into the field device FD. The user interface then provides input fields for completing the device parametering. In this application, let us assume, for example, that the dielectric constant, DK for short, plays an essential role. By associating the application with a certain parametering module PM1, PM2, PMn, a limiting of the DK to DK>7 can be effected in the parametering. By using the selected parametering module, thus, for example, also ranges for certain parameters T, or parameter values, can be set, or parameter settings can be limited, when a corresponding application was recognized by the auxiliary module AM.

The number of parameters T to be configured is, thus, not determined with respect to the device complexity of the field device FD, but, instead, with respect to the complexity of the application, in which the field device FD is to be applied.

The device functions F1, F2 of the field device can, furthermore, be divided, for example, into groups. This solution has characteristics as follows:

No technical means are required in the field device, but, instead, a logical organization of the device functionalities into groups (applicable for already existing devices).

The algorithm is directly applicable with standard technologies for device configuration (FDT-DTM as well as EDD).

Based on the CAD/CAE data, the auxiliary module AM can thus select one of the parametering modules PM1, PM2, PMn. To this end, for example, an algorithm can be provided in the auxiliary module AM, by means of which one of the parametering modules PM1, PM2, PMn is selected by comparison with specific CAD/CAE data. This is indicated in FIG. 1 by the switch between the auxiliary module AM and the parametering modules PM 1, PM 2, PM 3.

By means of the selected parametering module, then, a first portion T1 of the parameters of the field device FD is specified. To this end, the selected parametering module can be transmitted to the field device FD either via the fieldbus FB or another data line (not shown in FIG. 1), for example, even wirelessly.

Based on the parametering module, which includes, for example, statically specified parameters, i.e. the parameters contained in the parametering module are not changed upon or after its selection, then settings in the field device FD are carried out. Thus, preferably, in such case, the parameters, or parameter values, contained in the parametering module are simply transmitted into the field device FD, for example, into an internal memory of the field device FD.

As a function of the selected parametering module PM1, PM2, PMn and the therein contained parameters, or parameter values, then certain device function F1, F2, such as, for example, the device function F1, can be activated, or deactivated.

Since the selected parametering module in the example of an embodiment in FIG. 1 has only specifications for the first portion T1 of the device parameters T of the field device FD, it can be necessary to make the settings of parameters, which belong to a second portion T2. These settings can be performed, for example, by a user of the field device FD, for example, on-site in the field device FD or, however, also by the servicing device, which contains the auxiliary module AM. Also, as a function of the parameters of the second portion T2 of field device parameters T, certain device functions F1, F2 can be activated, or deactivated.

For a backup, for example, the only parameters, or parameter values, T of the field device FD which need to be backed up and/or stored in a memory unit, not shown, outside of the field devices FD are those belonging to activated device functions F1, F2. The backup and especially the retrieval of the activated, or deactivated, device functions F1, F2 can be done, for example, likewise by the auxiliary module. In such case, only the parameters, or parameter values, need to be backed up, which serve activated device functions F1, F2.

LIST OF REFERENCE CHARACTERS

PM1 first parametering module
PM2 second parametering module
PMn nth parametering module
AM auxiliary module
CAD/CAE data relating to the application of the field device, here CAD, or CAE, data
FD field device
FB fieldbus
T total number of parameters of the field device
T1 first portion of the parameters of the field device
T2 second portion of the parameters of the field device
F1 first device function
F2 second device function

The invention claimed is:

1. A method for parametering a field device of process automation technology via a servicing device, wherein the field device has a first portion of device parameters and a number of corresponding device functions, said first portion of device parameters serve for performance of the function of the field device in an aforementioned application and the corresponding device function are activated, or deactivated, by the settings of said first portion of device parameters, wherein the method comprises the steps of:

providing an auxiliary module and a plurality of parametering modules by said servicing device, wherein the plurality of parametering modules are matched to different aforementioned applications of the field device by included statically specified parameters;

selecting by means of the auxiliary module one of said plurality of parametering modules for parametering the field device for said aforementioned application;

transmitting said selected one parametering module and the contained statically specified parameters into the field device by the servicing device; and activating or deactivating said number of corresponding device functions according to the transferred statically specified parameters, so that the field device is parameterized for said aforementioned application.

2. The method as claimed in claim 1, wherein:
one of the parametering modules is selected by the auxiliary module by performing a comparison of data, which relate to the aforementioned application of the field device, with furnished data; and
based on the comparison, one of the parametering modules is selected.

3. The method as claimed in claim 1, wherein:
the field device has different functions, which are furnished in the field device and are activatable;
the parameters of the field device are associated with at least one of the functions of the field device; and
the activating of one of the functions is done by the parametering module and/or established in the parametering module.

4. The method as claimed in claim 1, wherein:
by means of one of the parametering modules, a second portion of parameters is selected, whose parameter values are established before start-up of the field device by a service person.

5. The method as claimed in claim 4, wherein:
the first and the second portions are complementary or overlapping and the joining of the first and the second portions forms an entire amount of parameters of the field device.

6. The method as claimed in claim 1, wherein:
a backup of the parameters of the field device is done by backing up only the parameters associated with the active functions of the field device, which are downloaded from the field device via a fieldbus.

7. The method as claimed in claim 6, wherein:
the backup of the parameters of the field device is done, furthermore, by backing up the values of the parameters specified by the selected parametering module.

8. The method as claimed in claim 1, wherein:
the data (CAD/CAE), which relate to the aforementioned application of the field device, are CAD/CAE data.

* * * * *